United States Patent [19]

Peetz et al.

[11] Patent Number: 4,875,308
[45] Date of Patent: Oct. 24, 1989

[54] ADJUSTABLE INSULATING GLASS WINDOW

[75] Inventors: Dieter Peetz, Aachen; Peter Scheeren, Monschau; Hans-Peter Siemonsen, Aachen; Ralf Reinicke, Koln; Lothar Witting, Neunkirchen-seelscheid; Aloisius Schafhausen, Troisdorf, all of Fed. Rep. of Germany

[73] Assignee: Saint-Gobain Vitrage, Courbevoie, France

[21] Appl. No.: 148,823

[22] Filed: Jan. 27, 1988

[30] Foreign Application Priority Data

Jan. 28, 1987 [DE] Fed. Rep. of Germany ....... 3702402

[51] Int. Cl.4 .............................................. E06B 3/00
[52] U.S. Cl. ........................................ 49/501; 52/790; 296/146
[58] Field of Search .................. 52/172, 304, 790, 788, 52/203; 49/40, 502, 374; 296/146

[56] References Cited

U.S. PATENT DOCUMENTS 2,030,869 2/1936 Haven .................................... 52/790

FOREIGN PATENT DOCUMENTS

3517581A1 9/1986 Fed. Rep. of Germany .

Primary Examiner—Kenneth J. Dorner
Assistant Examiner—Gerald A. Anderson
Attorney, Agent, or Firm—Pennie & Edmonds

[57] ABSTRACT

An adjustable insulating window is disclosed comprising two glass sheets separated by and bonded to a bonding strand which is positioned inward relative to the peripheral edge surface of each of the glass sheets. A groove is formed along the peripheral edge surface of the window by the bonding strand and the peripheral edge of the two glass sheets, into which groove a profile strip is placed flush with at least one glass sheet and fastened by the bonding strand.

46 Claims, 4 Drawing Sheets

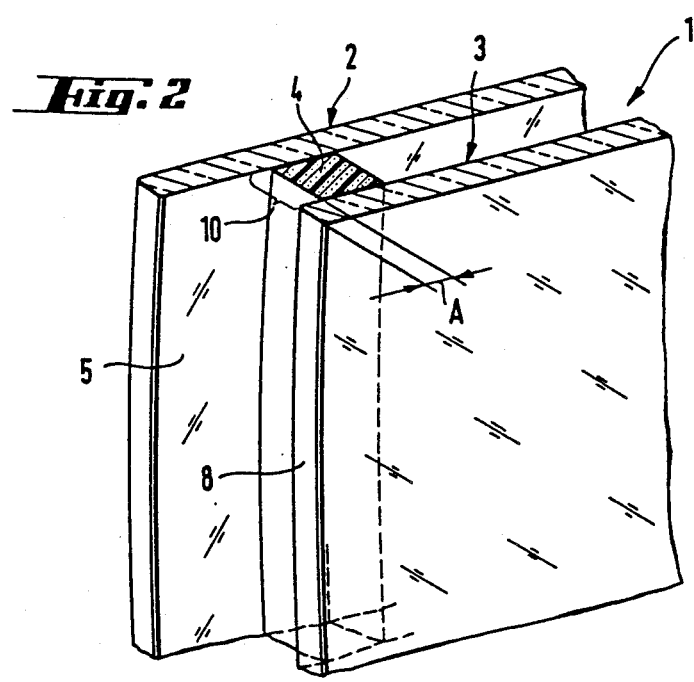
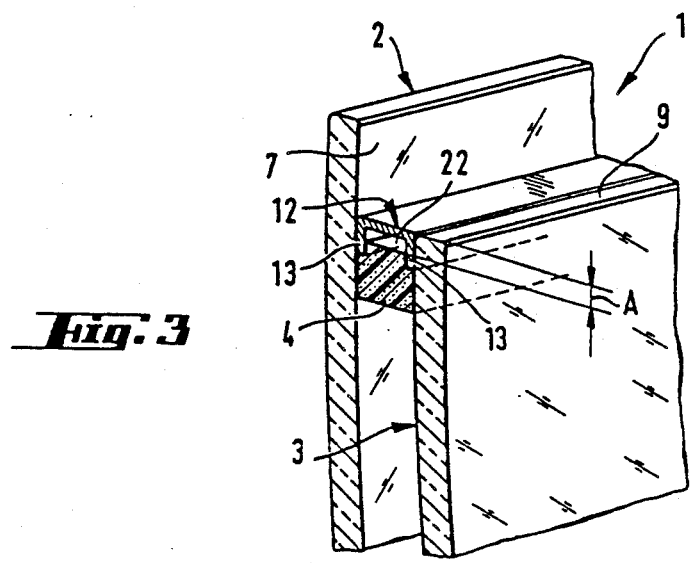

ADJUSTABLE INSULATING GLASS WINDOW

BACKGROUND OF THE INVENTION

This invention relates generally to insulating glass windows, and more particularly to a vertically adjustable side window for motor vehicles, comprising two glass sheets separated slightly from each other and bonded to opposite sides of a bonding strand and having a profile strip inserted into the bonding strand.

Insulating glass windows for vehicles are known in the art. In a known device, for example, each of the two glass sheets that form the insulating glass window are of the same size. Another known device is illustrated in patent document DE-OS 35 17 581, in which the insulating glass window has a step-shaped edge and one of the two glass sheets projects beyond the other at least on the side edges and on the top edge, such that the projecting side edges of the larger glass sheet are guided in a frame.

Various devices have been proposed to serve as the spacer and edge seal between the two glass sheets of an insulating glass window. For example, some devices utilize a metal or plastic profile which is bent to follow the perimeter and the surface curvature of one of the glass sheets and then bonded to each of the glass sheets so as to serve as a spacer. This metallic spacer is usually positioned inward relative to the peripheral edge of both of the glass sheets. A groove is thus formed defined by the metallic spacer and the inner opposing surface of each of the two glass sheets. Such a groove is generally filled with a sealing and bonding material.

Unfortunately, the metal profile must be precisely bent so as to follow not only the perimeter of the glass but also to follow the curvature of the glass. Due to the rigidity of metal and the inflexibility of the glass, the three dimensional bend must be made to precise tolerances.

Another disadvantage of such known devices relates to the sealing and bonding material. The sealing and bonding material which fills the groove defined by the metallic spacer and inner opposing surface of each of the two glass sheets, is visible on the peripheral edge surfaces of the insulating glass window and is exposed to the environment.

With vertically movable side windows for motor vehicles, as well as with other frameless and openable windows, the peripheral edge surface of the insulating glass window comprising the sealing and bonding material becomes visible when the window is opened. The sealing and bonding material thus visibly distracts from the appearance of the window. The appearance of the window is further compromised due to uneven application of the sealing and bonding material. Furthermore, dirt tending to collect on the surface of the sealing and bonding material makes for difficult cleaning, especially when such dirt collects during the setting of the sealing and bonding material.

Thus, a vertically adjustable window is desirable comprising two sheets of glass separated by and bonded to a bonding strand shifted inward relative to the peripheral edge surfaces of the glass sheets and having exposed to the exterior at the peripheral edge surface of the glass a profile strip which is aesthetically pleasing and easily cleaned.

SUMMARY OF THE INVENTION

The present invention comprises first and second glass sheets separated by and bonded to a bonding strand with the bonding strand positioned inward relative to the peripheral edge surfaces of each of the glass sheets, thus forming a groove into which a profile strip is placed.

In the preferred embodiment of the invention, the bonding strand is located near and slightly inward to the perimeter of at least one of the glass sheets. Separation between the two glass sheets is maintained by the bonding strand which also serves as a spacer and which is in contact with each of the two glass sheets. Alternatively, the profile strip may determine the separation between the two glass sheets, as is the situation if a relatively compressable bonding strand is used.

Use of a bonding strand as a spacer in the preferred embodiment is especially advantageous in the production of curved insulating glass windows because the bonding strand follows the perimeter as well as surface curvature of the glass sheets without imposing unnecessary stresses, spaces and associated problems during construction and use of the window. In addition, such a bonding strand compensates for nonuniformity in the distance separating the two glass sheets caused by finite tolerances in the manufacture of the two glass sheets.

Proper placement of the profile strip at least partially into the bonding strand thus assures a flush fit with at least one of the glass sheets and matching to the peripheral edge of that glass sheet. The profile strip is advantageously held in place by the bonding strand. Since the bonding strand is at least somewhat compressable during its setting, the profile strip may easily be inserted to a desired depth so as to be flush with at least one glass sheet.

Such a profile strip is preferably placed only in the groove at the areas of the peripheral edge surface that are visible when the window is open.

Accordingly, it is a principal object of the present invention to provide new and improved glass windows.

Another object of the present invention is to provide an insulating glass window which is movable within a frame.

A further object of the present invention is to provide an insulating glass window having an aesthetically pleasing and easily cleaned peripheral edge surface.

A still further object of the present invention is to provide an insulating glass window formed from two glass sheets and having a predetermined space maintained thereinbetween, such space being determined by the width of a bonding strand and/or a profile strip.

Another object of the present invention is to provide a bonding strand to which a profile strip is attached, between two curved glass sheets of an insulating window, thereby easily forming and maintaining a predetermined space between the two curved glass sheets.

A further object of the present invention is to provide an insulating glass window formed from two glass sheets separated by and bonded to a bonding strand which is shifted inward relative to the perimeter of at least one of the glass sheets.

Another object of the present invention is to provide an improved method for the production of insulating glass windows.

BRIEF DESCRIPTION OF THE DRAWINGS

These and other objects, features and advantages of the invention will become more readily apparent with reference to the following detailed description of the invention in which like elements are similarly labeled and in which:

FIG. 2 is an enlarged view along line II—II of FIG. 1;

FIG. 3 is an enlarged view along line III—III of FIG. 1;

DETAILED DESCRIPTION OF THE DRAWINGS

Figure 1:
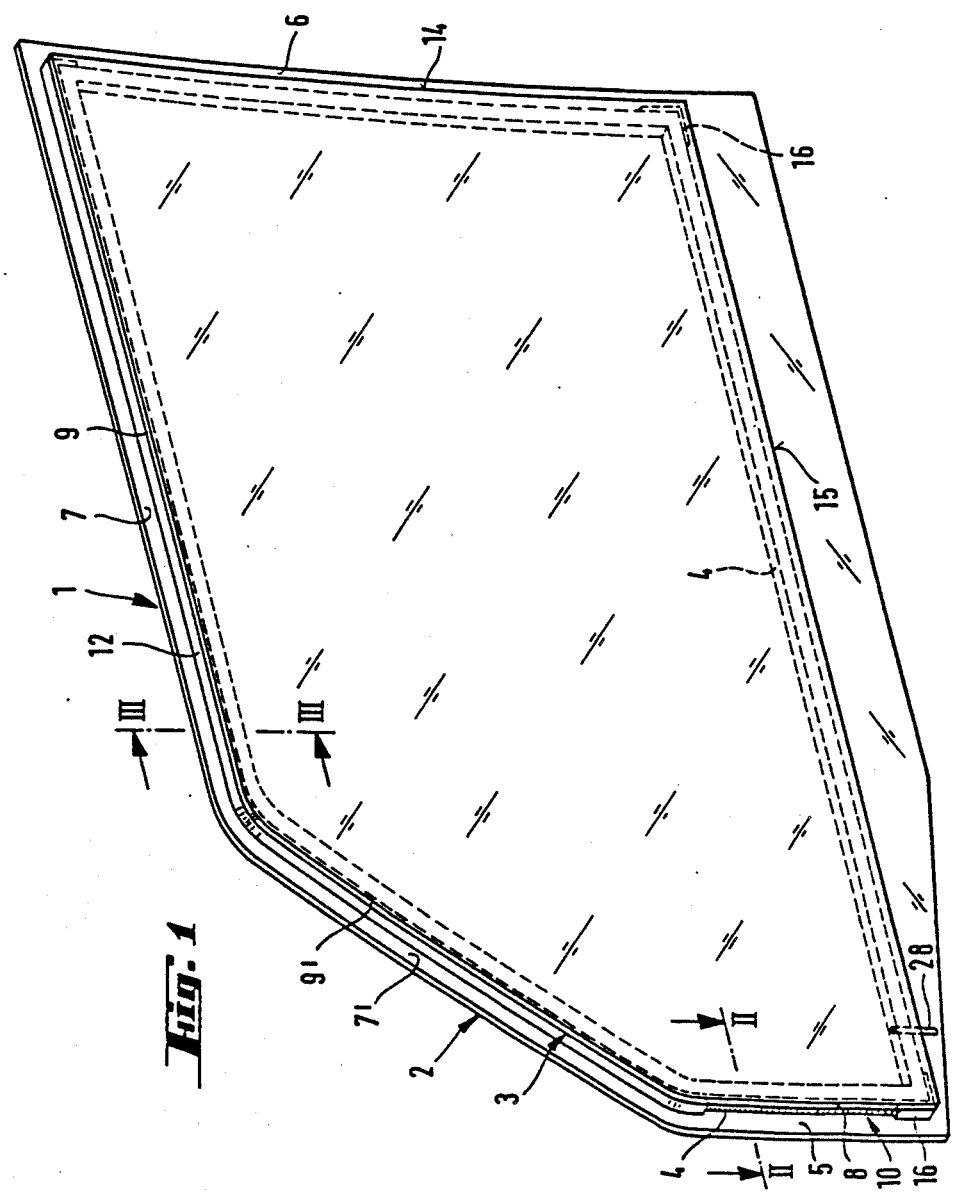
FIG. 1 is a perspective view depicting an insulated motor vehicle window constructed according to the invention.

Referring to FIG. 1, there is shown a preferred embodiment of the invention comprising an insulated vertically adjustable door window 1, illustratively for use in a passenger car. Insulating window 1 comprises a first tempered safety glass sheet 2 which, on an exterior surface, is curved to appear convex, a second tempered safety glass sheet 3 which, on an interior surface, is curved to appear concave, a bonding strand 4 and a profile strip 12.

Both curved glass sheets 2 and 3 are bonded to one another with an air distance preferably on the order of a few millimeters separating them, by the bonding strand 4 which serves as a spacer between the glass sheets and simultaneously as a bonding agent. The outer glass sheet 2 is, in the embodiment shown, larger than the inner glass sheet 3 so that a steplike edge formation results between the two respective edges of the glass sheets, at least for a portion of the perimeter of the window. Alternatively, the arrangement can be reversed, i.e., the inner glass sheet can be smaller than the outer glass sheet. Laterally protruding edge areas 5 and 6 of outer glass sheet 2 are guided in the door frame in corresponding guide channels (not shown). Upper protruding edge areas 7, 7' serve to seal the upper edge of the insulating window assembly and engage, when the window is closed, in a correspondingly formed seal placed in the door frame.

Referring now to FIGS. 2 and 3, bonding strand 4 is arranged so that it begins at a distance A, illustratively 2 mm to 4 mm, from peripheral edge surface 8 of glass sheet 3. This distance A is maintained by bonding strand 4 along the entire periphery of glass sheet 3. The bonding strand may be any suitable material and preferably is a moisture hardening polyurethane material.

A groove 10 is defined by bonding strand 4 and the interior opposed surfaces of the two glass sheets along the portion of the peripheral edge surface of the insulating glass window that becomes visible when the window is opened. Groove 10 is closed by profile strip 12. The cross section of profile strip 12 may take on a variety of forms but is preferably designed such that it has externally a flat area of contact, which is located in the plane of peripheral surface 9, 9' of inner glass sheet 3 and is adjacent to this peripheral surface. Internally, profile strip 12 is provided with projections 13 by which it is anchored in bonding strand 4. For example, the cross section of profile strip 12 may illustratively be U-shaped, as is seen in FIG. 3. The projections, i.e., side shanks 13, of profile strip 12 are in contact with bonding strand 4 and are permanently fastened by the bonding effect of the bonding strand.

Along vertical peripheral surfaces 8, 14 and along a lower peripheral surface 15, groove 10 defined by bonding strand 4 and the interior opposed surfaces of the glass sheets is not provided with a profile strip. These areas of the peripheral surfaces are not visible in either the open or closed position of the window and therefore do not require a profile strip. Angle brackets 16 are placed in the area of each of the lower corners of the insulating glass sheet in groove 10 in order to maintain proper spacing between the glass sheets while bonding strand 4 hardens during the setting process.

Figure 4:
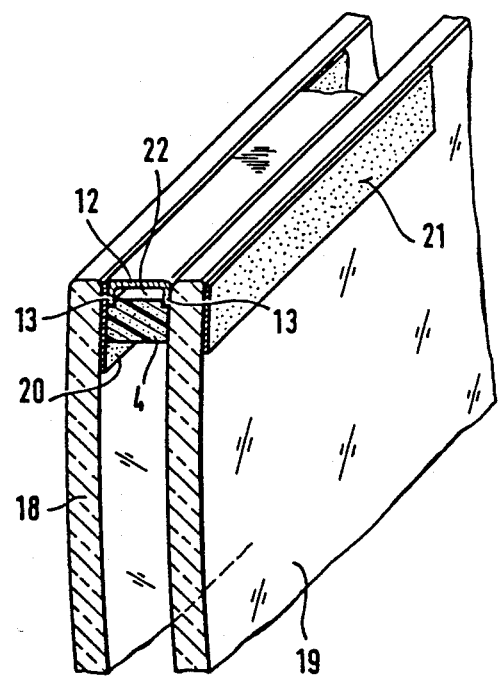
FIG. 4 is a perspective view of another embodiment of an insulating glass window according to the invention, presented as a cutaway drawing of an upper edge area.
Figure 5:
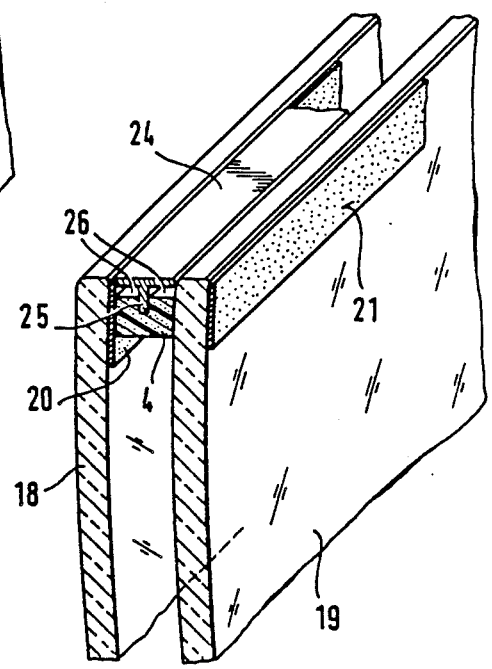
FIG. 5 is a perspective view of a further embodiment of an insulating glass window according to the invention, also presented as a cutaway drawing of an upper edge area.

Referring now to FIGS. 4, and 5, there is depicted alternate embodiments of the invention in which an upper edge area of the window comprises two flush mounted glass sheets. The two glass sheets 18, 19 are the same size and shape so as to be flush, at least in areas visible when the window is in the open or closed position. More specifically, FIGS. 4 and 5 show a section in the upper edge area of a vertically adjustable motor vehicle side window. Outer glass sheet 18 is provided with an opaque framelike coating 20, preferably of a ceramic baked finish along its edge to which bonding strand 4 is bonded. Similarly, inner glass sheet 19 has such a framelike coating 21 along its edge area. Framelike coating 20, 21 may be placed on the outer surfaces of the two glass sheets or on the inner surfaces of the glass sheets 18, 19 adjacent to bonding strand 4. In addition to its aesthetic effect, coatings 20, 21 have the effect of protecting the bonding strand from ultra-violet rays.

Profile strip 12 which, in the embodiment depicted in FIG. 4, has a U-shaped cross-section, is anchored by its side shanks 13 in bonding strand 4 and forms, between side shanks 13 and bonding strand 4, a channel-like hollow space 22, which is in contact with the outside air at the ends of profile strip 12.

This channel-like hollow space 22 serves to aerate bonding strand 4 during the setting process time to expedite the setting or bonding process. This channel-like hollow space 22 is of special significance when bonding strand 4 consists of a moisture hardening polyurethane material, whose setting requires an environment of moist air.

The insulating glass window depicted in FIG. 5 is identical to the insulating glass window depicted in FIG. 4, except for the construction of the profile strip and its bonding to bonding strand 4. Profile strip 24 in FIG. 5 has a T-shaped cross-section and a middle shank 25 which penetrates into and is fastened by bonding strand 4. In this embodiment, two channel-like hollow spaces 26 are formed which again have the function of aeration for bonding strand 4 during the setting process.

The profile strip may be constructed of any suitable material, such as aluminum or plastic. In the illustrative case of an aluminum profile strip, the exterior visible surface may be treated, for example, by anodizing it dark.

The separation distance between the two glass sheets may be determined by the bonding strand and/or the profile strip. Illustratively, such distance is determined by the profile strip especially in the case of a bonding strand that is compressable or deformable during assembly of the glass sheets. However, depending on the characteristics of the bonding strand and the type of and placement of the profile strip, the bonding strand may determine the distance.

Figure 6:
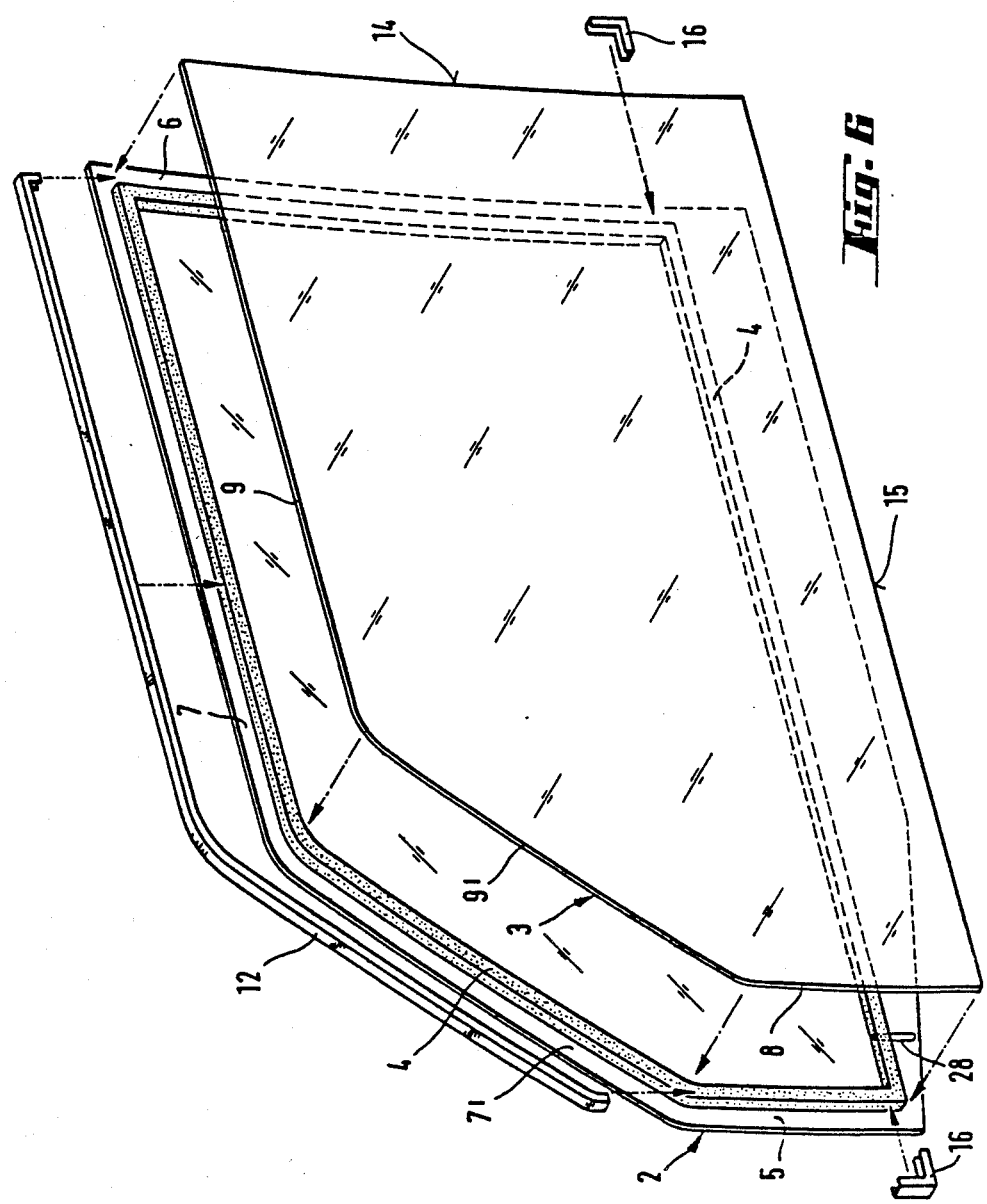
FIG. 6 is an exploded perspective view depicting the production process for the insulating glass window.

Referring now to FIG. 6, the insulating glass window is constructed as follows. An approximately 4-6 mm thick and approximately 4-6 mm wide bonding strand of a moisturehardening polyurethane material is extruded by an automatically guided extrusion head and is applied at a distance of about 15 mm from the peripheral edge of a horizontally oriented glass sheet 2. This bonding strand 4 forms a spacer and simultaneously tightly bonds the glass sheets to each other once glass sheet 3 is placed upon glass sheet 2. At a suitable point in the lower section of bonding strand 4, a small air tube 28 is inserted through which pressure equalization is maintained between the intermediate air space between the two glass sheets and the outer atmosphere. Profile strip 12, which has previously been bent according to the contour of smaller glass sheet 3 is positioned on the inner surface of the projecting edge area of larger glass sheet 2 and pressed into bonding strand 4 until the exterior visible surface of profile strip 12 lies flush with the peripheral surface of smaller glass sheet 3. Each of the two angle brackets 16 is then pressed into strand 4 in the area of the lower corners until its outer surfaces also lies flush with the peripheral surface of glass sheet 3. Glass sheets 2 and 3 are then further pressed together until they are each urged against profile strip 12 and angle brackets 16. With the aid of clamps placed at suitable distances along the periphery of the insulating glass window, the required amount of pressure is maintained until strand 4 has set to the point that each of the glass sheets may no longer be shifted. Thus, the distance separating the two glass sheets is determined by the width of the profile strip and the width of the angle brackets. After removal of the clamps the production process of the insulating glass window is finished.

Thus it can be seen that there is provided an insulating glass window which is aesthetically pleasing, easily cleaned and easily manufactured without the need for metal or of exposing bonding and sealing material to the environment. In addition, it is to be understood that the invention can be carried out by specifically different equipment and devices and that various modifications, both as to equipment details and operating procedures can be effected without departing from the spirit and scope of the claimed invention.

More specifically, the claimed invention is not limited to any particular mode or direction of adjustment, nor to any particular use of the window. Any suitable material may be used for the bonding strand and profile strip.

What is claimed is:

1. An insulating glass window comprising first and second glass sheets, a profile strip and a bonding strand separating and bonding the two glass sheets to one another and sealing an intermediate air space, characterized in that said bonding strand is located inward relative to peripheral edge surfaces of the two glass sheets thereby forming a groove into which said profile strip is placed, said profile strip having at least one projection element directed toward said bonding strand and partially inserted into and anchored in said strand, and capable of maintaining an external periphery surface of said profile strip in flush relation with the peripheral edge surface of at least one of said glass sheets.

2. The insulating glass window of claim 1, wherein said profile strip is provided with a U-shaped cross section having two side shanks and is anchored in said bonding strand by both of said two side shanks.

3. The insulating glass window of claim 1, wherein said profile strip is provided with a T-shaped cross section having a middle shank and is anchored in said bonding strand by said middle shank.

4. The insulating glass window of claim 1, wherein said profile strip is constructed of aluminum and at least its visible surface is anodized dark.

5. The insulating glass window of claim 1, wherein said profile strip is constructed of plastic.

6. The insulating glass window of claim 1, wherein said profile strip, said bonding strand and at least one of said first and second glass sheets define at least one channel-like hollow space which is in contact with the outer atmosphere.

7. The insulating glass window of claim 1, wherein each of said glass sheets are provided with a coating covering an area adjacent said bonding strand.

8. The insulating glass window of claim 7, wherein said coating is a ceramic baked coating.

9. The insulating glass window of claim 1, wherein a pressure equalizing tube is provided in said bonding strand and connects said intermediate air space with the outside atmosphere.

10. The insulating glass window of claim 1, wherein said window is a vertically adjustable side window of a motor vehicle.

11. The insulating glass window of claim 10, wherein said profile strip is placed at least in peripheral edge areas which are visible when said vertically adjustable side window is at least partially open.

12. An insulating glass window comprising:
a first glass sheet;
a second glass sheet;
a bonding strand bonding said first glass sheet to said second glass sheet and maintaining a separation distance between the two glass sheets and sealing the air space therebetween, wherein said bonding strand is positioned inward from a peripheral edge of each of said two glass sheets thereby forming a groove; and
a profile strip placed in said groove having at least one projection element directed toward said bonding strand and partially inserted into and anchored in said bonding strand, and capable of maintaining an external peripheral surface of said profile strip in flush relation with an edge of at least one of said two glass sheets.

13. The insulating glass window of claim 12, wherein said bonding strand is a moisture hardening polyurethane material.

14. The insulating glass window of claim 12, wherein said bonding strand, said profile strip and at least one of said first and second glass sheets define at least one channel-like hollow space.

15. The insulating glass window of claim 12, wherein said profile strip is plastic.

16. The insulating glass window of claim 12, wherein said profile strip is metal.

17. The insulating glass window of claim 12, wherein a pressure equalizing tube is inserted into said bonding strand.

18. The insulating glass window of claim 12, wherein said window is a vertically adjustable side window of a motor vehicle.

19. The insulating glass window of claim 18, wherein said profile strip is placed at least in peripheral edge areas which are visible when said vertically adjustable side window is at least partially open.

20. An insulating glass window comprising first and second glass sheets and a bonding strand separating and bonding the two glass sheets to one another and sealing an intermediate air space, characterized in that said bonding strand is located inward relative to peripheral edge surfaces of the two glass sheets thereby forming a groove into which a profile strip having a U-shaped cross section and including two side shanks is placed so that the profile strip forms a flush fit with at least one of the two glass sheets and is matched to the shape of the peripheral edge surfaces of the glass sheets and said side shanks are inserted into and fastened to the bonding strand.

21. The insulating glass window of claim 20 wherein said profile strip is metal.

22. The insulating glass window of claim 21, wherein said profile strip is constructed of aluminum and at least its visible surface is anodized dark.

23. The insulating glass window of claim 20, wherein said profile strip is constructed of plastic.

24. The insulating glass window of claim 20, wherein said profile strip, said bonding strand and at least one of said first and second glass sheets define at least one channel-like hollow space which is in contact with the outer atmosphere.

25. The insulating glass window of claim 20, wherein said glass sheets are provided with a coating covering an area adjacent said bonding strand.

26. The insulating glass window of claim 25, wherein said coating is a ceramic baked coating.

27. The insulating glass window of claim 20, wherein a pressure equalizing tube is provided in said bonding strand and connects said intermediate air space with the outside atmosphere.

28. The insulating glass window of claim 20, wherein said window is a vertically adjustable side window of a motor vehicle.

29. The insulating glass window of claim 28, wherein said profile strip is placed at least in peripheral edge areas which are visible when said vertically adjustable side window is at least partially open.

30. An insulating glass window comprising first and second glass sheets and a bonding strand separating and bonding the two glass sheets to one another and sealing an intermediate air space, characterized in that said bonding strand is located inward relative to peripheral edge surfaces of the two glass sheets thereby forming a groove into which a profile strip having a T-shaped cross section and including a middle shank is placed so that the profile strip forms a flush fit with at least one of the two glass sheets and is matched to the shape of the peripheral edge surfaces of the glass sheets and said middle shank is inserted into and fastened to the bonding strand.

31. The insulating glass window of claim 30 wherein said profile strip is metal.

32. The insulating glass window of claim 31, wherein said profile strip is constructed of aluminum and at least its visible surface is anodized dark.

33. The insulating glass window of claim 30, wherein said profile strip is constructed of plastic.

34. The insulating glass window of claim 30, wherein said profile strip, said bonding strand and at least one of said first and second glass sheets define at least one channel-like hollow space which is in contact with the outer atmosphere.

35. The insulating glass window of claim 30, wherein said glass sheets are provided with a coating covering an area adjacent said bonding strand.

36. The insulating glass window of claim 35, wherein said coating is a ceramic baked coating.

37. The insulating glass window of claim 30, wherein a pressure equalizing tube is provided in said bonding strand and connects said intermediate air space with the outside atmosphere.

38. The insulating glass window of claim 30, wherein said window is a vertically adjustable side window of a motor vehicle.

39. The insulating glass window of claim 28, wherein said profile strip is placed at least in peripheral edge areas which are visible when said vertically adjustable side window is at least partially open.

40. An insulating glass window comprising:
   a first glass sheet;
   a second glass sheet;
   a bonding strand bonding said first glass sheet to said second glass sheet and maintaining a separation distance between the two glass sheets, wherein said bonding strand is a moisture hardening polyurethane material and is positioned inward from a peripheral edge of each of said two glass sheets; and
   a profile strip at least partially inserted into said bonding strand such that said profile strip forms a flush fit with at least one of said two glass sheets.

41. The insulating glass window of claim 40, wherein said bonding strand, said profile strip and at least one of said first and second glass sheets define at least one channel-like hollow space.

42. The insulating glass window of claim 40, wherein said profile strip is plastic.

43. The insulating glass window of claim 40, wherein said profile strip is metal.

44. The insulating glass window of claim 40, wherein a pressure equalizing tube is inserted into said bonding strand.

45. The insulating glass window of claim 40, wherein said window is a vertically adjustable side window of a motor vehicle.

46. The insulating glass window of claim 45, wherein said profile strip is placed at least in peripheral edge areas which are visible when said vertically adjustable side window is at least partially open.

* * * * *